(12) United States Patent
Radue et al.

(10) Patent No.: US 11,946,429 B2
(45) Date of Patent: *Apr. 2, 2024

(54) SPARK IGNITED SINGLE CYLINDER ENGINE DERATE FOR OVERHEAT

(71) Applicant: Kohler Co., Kohler, WI (US)

(72) Inventors: Martin Radue, Plymouth, WI (US); Brian Hartwig, New Holstein, WI (US)

(73) Assignee: KOHLER CO.

( * ) Notice: Subject to any disclaimer, the term of this patent is extended or adjusted under 35 U.S.C. 154(b) by 0 days.

This patent is subject to a terminal disclaimer.

(21) Appl. No.: 17/967,956

(22) Filed: Oct. 18, 2022

(65) Prior Publication Data

US 2023/0044054 A1 Feb. 9, 2023

Related U.S. Application Data

(63) Continuation of application No. 16/783,391, filed on Feb. 6, 2020, now Pat. No. 11,519,352.

(Continued)

(51) Int. Cl.
*F02D 41/04* (2006.01)
*F02B 75/16* (2006.01)
(Continued)

(52) U.S. Cl.
CPC .............. *F02D 41/04* (2013.01); *F02B 75/16* (2013.01); *F02D 41/1454* (2013.01);
(Continued)

(58) Field of Classification Search
CPC .. F02D 41/04; F02D 41/1454; F02D 41/3005; F02D 2200/021; F02D 2200/023;
(Continued)

(56) References Cited

U.S. PATENT DOCUMENTS 5,101,619 A 4/1992 Morris et al.
5,928,111 A * 7/1999 Sakakibara ........... F02D 41/022
477/181

(Continued)

FOREIGN PATENT DOCUMENTS

CN 105275646 A 1/2016
DE 102015117973 A1 4/2016
(Continued)

OTHER PUBLICATIONS

Acoba, Paulo, "How Cadillac's Northstar V8 Turns into an Air Cooled Engine to Prevent Overheating," Tire Meets Road, Mar. 30, 2019, (pp. 1-4).

(Continued)

*Primary Examiner* — Joseph J Dallo
(74) *Attorney, Agent, or Firm* — The Belles Group, P.C.

(57) ABSTRACT

An engine includes a single cylinder, at least one sensor, a fuel injector, and a controller. The at least one sensor is configured to generate sensor data for an engine condition. The controller is configured to perform a comparison of the engine condition to a threshold and in response to the comparison, generate a first command to deactivate the fuel injector after a first predetermined time period and a second command to reactivate the fuel injector after a second predetermined time period.

20 Claims, 8 Drawing Sheets

Related U.S. Application Data

(60) Provisional application No. 62/891,664, filed on Aug. 26, 2019.

(51) Int. Cl.
  *F02D 41/14* (2006.01)
  *F02D 41/30* (2006.01)

(52) U.S. Cl.
  CPC .... *F02D 41/3005* (2013.01); *F02D 2200/021* (2013.01); *F02D 2200/023* (2013.01); *F02D 2200/04* (2013.01); *F02D 2200/50* (2013.01)

(58) Field of Classification Search
  CPC ............. F02D 2200/04; F02D 2200/50; F02D 31/001; F02D 41/065; F02D 2400/06; F02B 75/16; F02B 77/089; Y02T 10/40
  See application file for complete search history.

(56) References Cited

U.S. PATENT DOCUMENTS

| | | | |
|---|---|---|---|
| 6,065,445 A * | 5/2000 | Motose | F02D 41/401 |
| | | | 123/305 |
| 6,067,957 A * | 5/2000 | Motose | F02B 61/045 |
| | | | 123/305 |
| 6,116,228 A * | 9/2000 | Motose | F01N 13/12 |
| | | | 123/305 |
| 6,119,453 A * | 9/2000 | Motose | F02B 61/045 |
| | | | 440/89 R |
| 6,230,683 B1 * | 5/2001 | zur Loye | F02M 31/02 |
| | | | 123/435 |
| 6,286,482 B1 * | 9/2001 | Flynn | F02D 13/0215 |
| | | | 123/480 |
| 7,028,661 B1 | 4/2006 | Bonne et al. | |
| 7,204,235 B1 | 4/2007 | Gebby et al. | |
| 7,325,534 B1 | 2/2008 | Waters et al. | |
| 7,699,749 B2 | 4/2010 | Tamura | |
| 8,001,765 B2 | 8/2011 | Kawakita | |
| 9,181,912 B2 | 11/2015 | Arihara | |
| 9,702,294 B2 | 7/2017 | Willard | |
| 9,885,304 B2 | 2/2018 | Date | |
| 2007/0079795 A1 | 4/2007 | Gebby | |
| 2007/0089720 A1 * | 4/2007 | Takahashi | F02D 41/1475 |
| | | | 123/694 |
| 2007/0209619 A1 | 9/2007 | Leone | |
| 2012/0059568 A1 | 3/2012 | Matsumoto | |
| 2014/0288805 A1 | 9/2014 | Fujime | |
| 2014/0352659 A1 | 12/2014 | Glugla et al. | |
| 2016/0377019 A1 * | 12/2016 | Russ | F02D 41/3094 |
| | | | 123/486 |
| 2017/0234253 A1 | 8/2017 | Serrano et al. | |
| 2017/0328296 A1 | 11/2017 | Kamio | |
| 2018/0087465 A1 | 3/2018 | Sanborn et al. | |
| 2019/0170052 A1 | 6/2019 | Dudar | |
| 2021/0062743 A1 | 3/2021 | Radue et al. | |

FOREIGN PATENT DOCUMENTS

| | | | | |
|---|---|---|---|---|
| JP | 2503703 B2 | 12/1989 | | |
| JP | H0914038 A | 1/1997 | | |
| JP | 3859036 B2 | 11/1997 | | |
| JP | 2002004908 A | 1/2002 | | |
| JP | 2007085240 A | 4/2007 | | |
| JP | 2015090129 A | 5/2015 | | |
| WO | WO-9942718 A1 * | 8/1999 | | F01L 1/352 |
| WO | WO-2005070175 A2 * | 8/2005 | | F01N 11/00 |
| WO | WO-2016196839 A1 * | 12/2016 | | |

OTHER PUBLICATIONS

Chinese Office Action from Chinese Patent Application No. 202010816198.6, dated Dec. 24, 2021, 8 pages (including English summary).

* cited by examiner

SPARK IGNITED SINGLE CYLINDER ENGINE DERATE FOR OVERHEAT

CROSS REFERENCE TO RELATED APPLICATIONS

The present application is a continuation of U.S. patent application Ser. No. 16/783,391, filed Feb. 6, 2020, which claims the benefit of U.S. Provisional Patent Application Ser. No. 62/891,664, filed Aug. 26, 2019, the entireties of which are incorporated herein by reference.

FIELD

This disclosure relates in general to overheat protection in an internal combustion engine.

BACKGROUND

An internal combustion engine converts potential chemical energy in the form of a fuel into mechanical energy. The core of this process is combusting where chemically energy is release from a mixture of fuel and air. The energy from combustion is converted to work during compressing to apply a force to at least one piston housed in a cylinder. Expansion of gas from the combustion pushes the piston. The piston rotates a crankshaft and rotational energy is output. An unwanted biproduct of this process is heat. Combustion releases heat. Friction of the moving part causes heat. The heat can cause the engine to become damaged or malfunction. One area of challenges is protection against overheating in internal combustion engines.

BRIEF DESCRIPTION OF THE DRAWINGS

Exemplary embodiments are described herein with reference to the following drawings.

DETAILED DESCRIPTION

Figure 1:
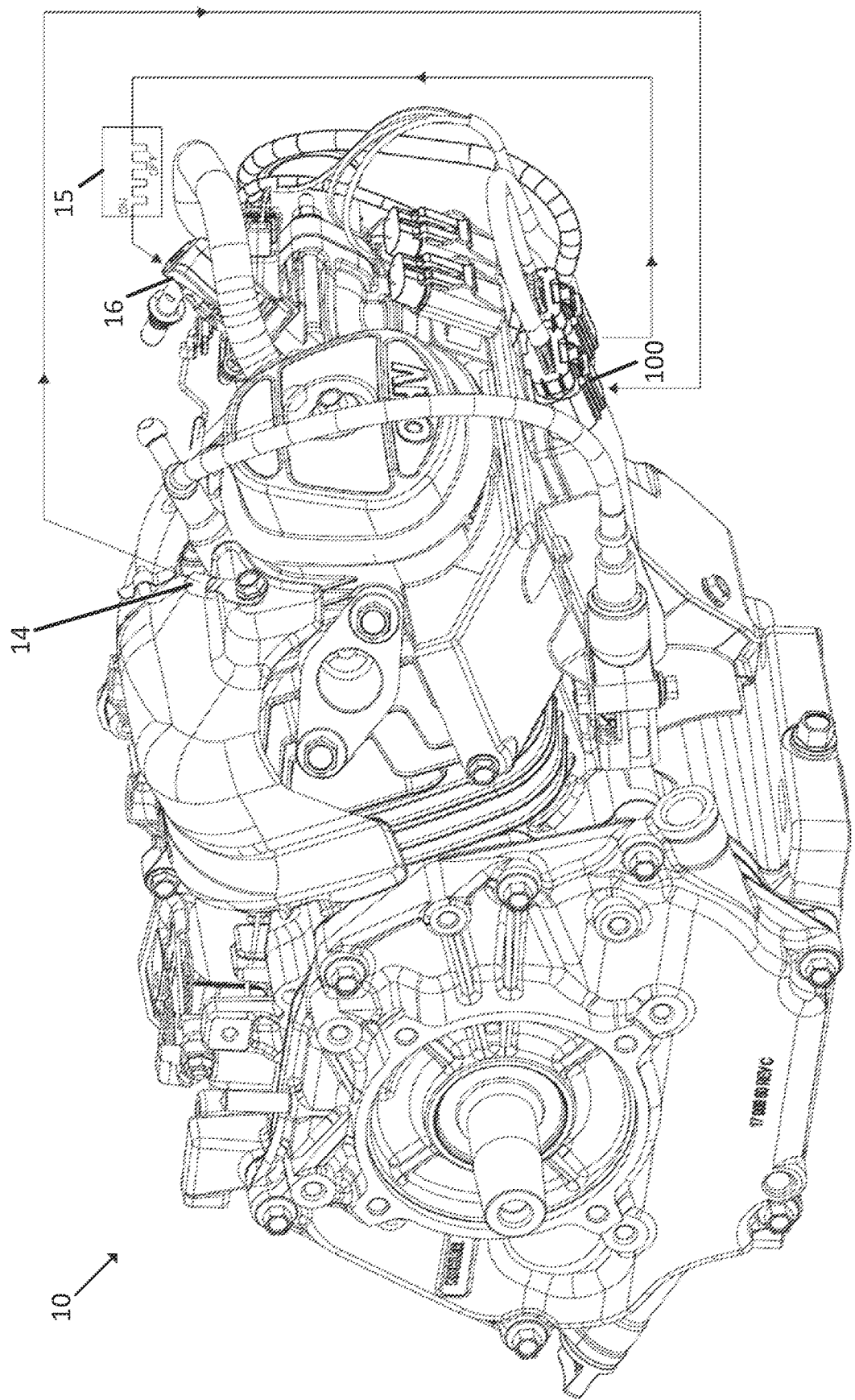
FIG. 1 illustrates an engine.

FIG. 1 illustrates a single cylinder engine 10 in which only a single cylinder provides the work output of the engine 10. As discussed in more detail below, the engine 10 may include a temperature sensor 14, a fuel injector 16, and a controller 100 (e.g., an engine control unit or ECU). The engine 10 may be used in a variety of devices including, but not limited to, chainsaws, lawn mowers, weed trimmers, all-terrain vehicles, wood splitters, pressure washers, garden tillers, snow blowers, a lawnmower, golf cart or other vehicles or devices.

The engine 10 may be a four-stroke cycle engine, meaning four piston strokes make up a cycle. A compression cycle of the engine 10 includes an intake stroke, a compression stroke, a power stroke, and an exhaust stroke. During the intake stroke, the piston moves from the top of the cylinder to the bottom of the cylinder. A fuel and air mixture is forced by a pressure into the cylinder. Next, during the compression stroke, the piston moves back to the top of the cylinder, compression the fuel and air mixture into the cylinder head. The fuel is injected and/or atomized into the cylinder by a nozzle of the fuel injector. Next, during the power stroke, the compressed fuel and air mixture is ignited by a spark plug or heat source. The piston is pushed back down toward the bottom of the cylinder by the pressure. Finally, during the exhaust stroke, the piston returns to the top of the cylinder to expel the spent or combusted fuel and air mixture through an exhaust valve. In spark ignition engines, the air and fuel mixture is forced into the cylinder during intake and after the piston compresses the mixture, the spark ignites the mixture. The combustion from the spark causes gas to expand, which pushes the piston during the power stroke. In a single cylinder engine there is only one cylinder connected to the intake manifold and only one cylinder connected to the exhaust of the engine.

One problem faced in the engine 10 is an overheat condition. The overheat condition results sometimes from normal usage in hot environments and other times from a malfunction in the operation.

The engine 10 may be air cooled. Rather than a radiator that houses cooling fluid that is pumped through the radiator in a liquid cooled engine, an air cooled engine includes one or more air paths through the engine that cool the engine. In some examples, the engine cylinder is cast with one or more fins that have a large surface area. As air blows across the cylinder and/or the fins, heat is removed from the engine. In the example of a lawnmower, debris (e.g., grass, dirt, sawdust) may clog the fins or the air path. This lessens the ability of the air path to cool the engine. It is possible that the operator may clean off the fins or engine to improve the air path. However, this problem of heat may not be immediately apparent to many operators. In some examples, the debris may be detected by a debris sensor that determines when debris is present in the lawnmower. For example, the debris sensor may be mounted near a window that provides a line of sight to the air path and to a reflector or another surface. When debris blocks the line of sight, the debris sensor generates data indicative of the presence of debris.

Other systems in the engine may include a fuel tank, a fuel line, a retractable starter, a starter handle, an air cleaning system, a muffler, a control portion, a governor system, a throttle system, and a lubrication system.

The governor system may be a mechanical governor or an electronic governor. The governor system controls the speed of the engine in response to various loads. In the example of a lawnmower, an increased load may be caused by wet grass or heavy grass/vegetation. The user operates a throttle input (e.g., slow to fast request lever) that requests that the engine 10 run at a certain speed or revolutions per minute (RPM). The engine 10 includes a governing mechanism between the lever and the throttle plate that controls air flow into the engine. The governing mechanism responds to loads. When the request for a speed is inputted from the lever, the engine 10 responds to various loads it expends during operation. The governing system detects the speed dropping from the additional load and determines an action to maintain the speed.

An electronic governor includes a controller (e.g., engine control unit ECU logic) that may limit the throttle to reduce heat produced in the engine 10. With the electronic governor, the controller may position throttles to perform overheat management. If the engine has electronic throttle control/governing, the controller can sense overheat and then limits how far the throttle opens to cause the engine 10 to produce less power and manage less heat.

However, a mechanical governor uses flyweights and springs to maintain the speed at a constant level, and there is no controller with control over the throttle position. The following embodiments provide a control mechanism to control heat generation using the fuel injector even where there is no control of the air flow through the engine 10. As shown in FIG. 1, the controller 100 evaluates sensor data from the temperature sensor 14 and, in response, provides a control signal 15 to the fuel injector 16. The single cylinder engine 10 cools in response to the command to deactivate the fuel injector by passing fresh cool uncombusted air through the combustion chamber and exhaust system.

Some systems may be ungoverned. For example, the single cylinder engine may be included in a marine application (e.g., board) or a vehicle application (e.g., golf cart) in which neither an electronic governor nor a mechanical governor is included.

Figure 2:
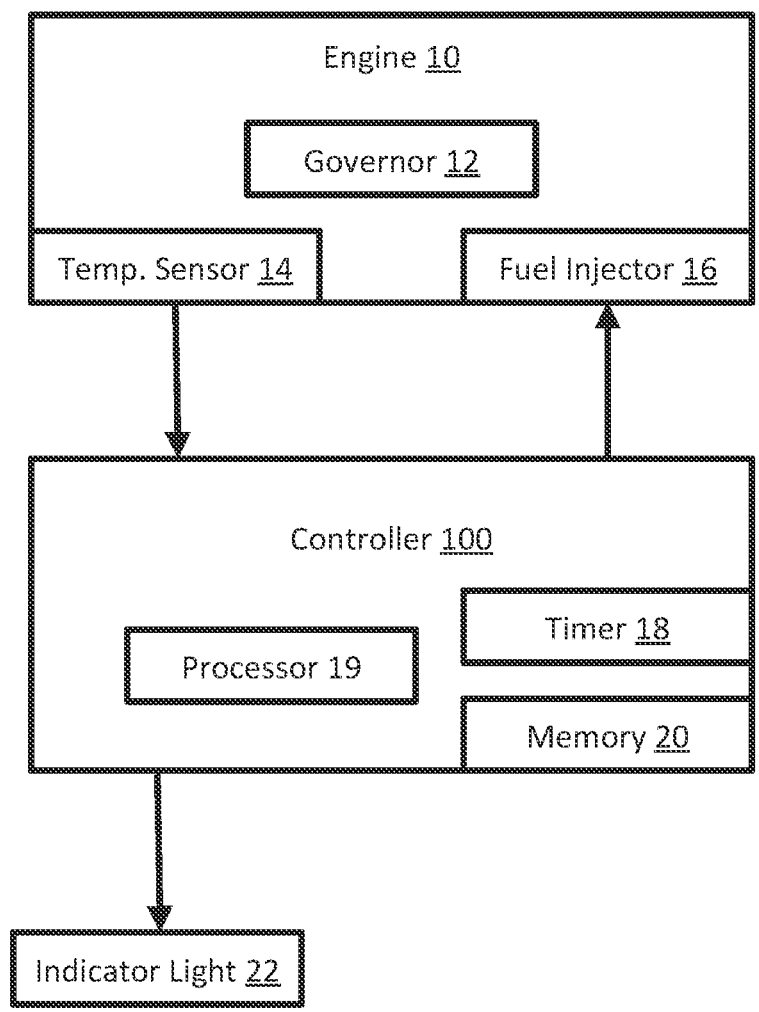
FIG. 2 illustrates a first embodiment of a control system to derate the engine of FIG. 1 in response to overheating.
Figure 3:
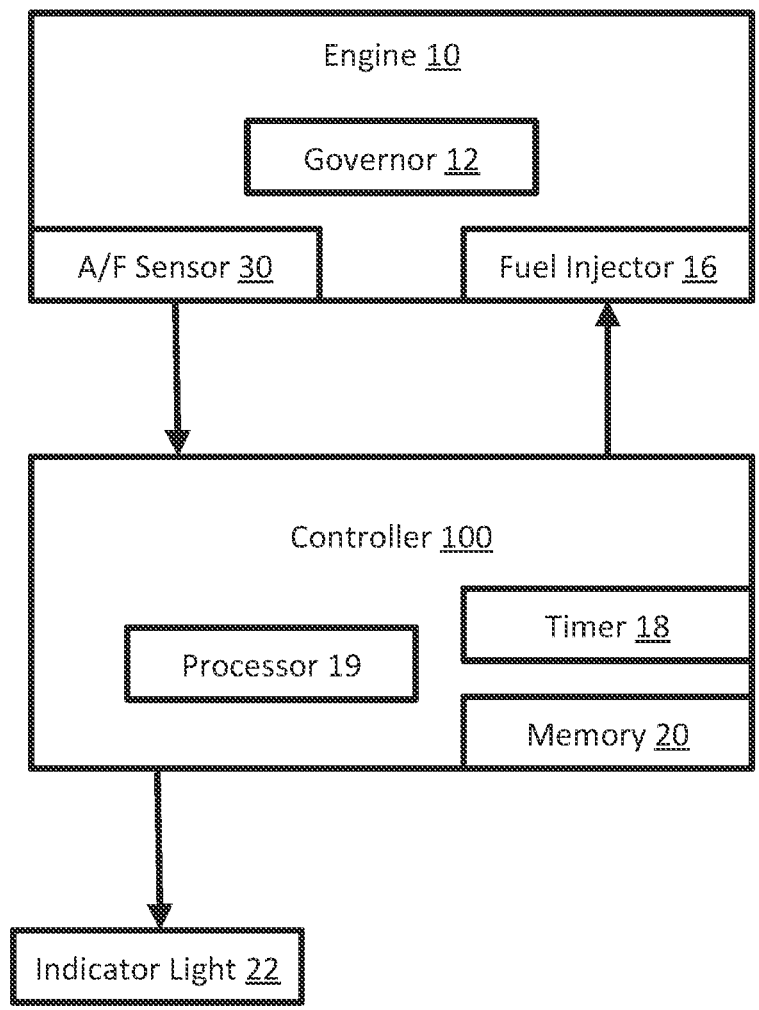
FIG. 3 illustrates a second embodiment of a control system to derate the engine of FIG. 1 in response to overheating.
Figure 4:
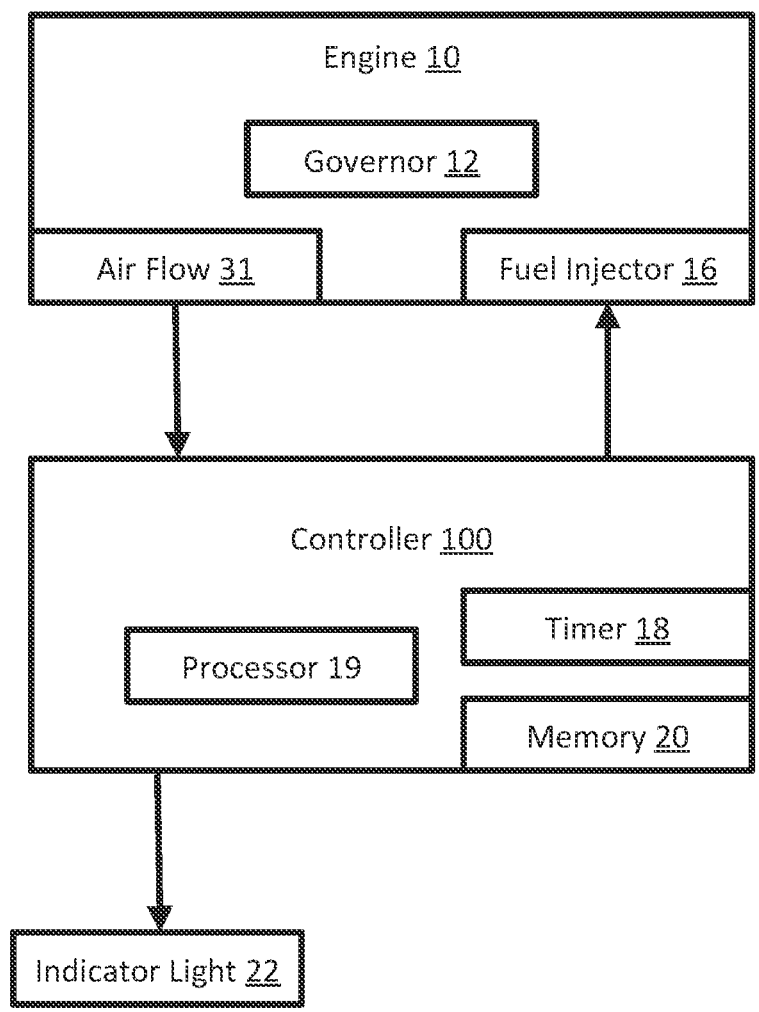
FIG. 4 illustrates a third embodiment of a control system to derate the engine of FIG. 1 in response to overheating.

FIGS. 2-4 illustrate examples of the engine 10 including a controller 100. The engine 10 may include a governor 12, a sensor (e.g., temperature sensor 14, air to fuel ratio (A/F) sensor 30, or air flow sensor 31), and a fuel injector 16. The fuel injector 16 is a single fuel injector for the single cylinder engine. The fuel injector 16 may have only one nozzle. FIG. 2 illustrates the temperature sensor 14, FIG. 3 illustrates the A/F sensor 30, and FIG. 4 illustrates the air flow sensor 31, but any combination of which may be included in a single embodiment. The controller 100 may include a processor 19, a timer 18, and a memory 20 as well as other components. The controller 100 may drive indicator light 22 through a driver circuit. Additional, different, or fewer components may be included.

In the embodiment of FIG. 2, the temperature sensor 14 measures the temperature of the engine 10. The temperature sensor 14 generates sensor data for an engine condition of temperature. The sensor data may include a series of temperature values and timestamps associated with the temperature values. For example, the sensor data may include temperature value and time value pairs in a vector or matrix.

The temperature sensor 14 may be located in various points in the engine 10. Example locations for the temperature sensor 14 may include the engine head, a radiator or fin coupled to the engine 10, or a coolant reservoir. The controller 100 is configured to perform the comparison of the temperature to the threshold.

In the embodiment of FIG. 3, the A/F sensor 14 measures the air to fuel ratio of the engine 10. The air to fuel ratio 30 generates sensor data for an engine condition of fuel richness. The sensor data may include a series of AF values and timestamps associated with the AF values. For example, the sensor data may include AF value and time value pairs in a vector or matrix. The richness of the air fuel mixture also may indicate an overheat or overrun condition of the engine 10. The controller 100 is configured to perform the comparison of the air to fuel ratio to the threshold.

In the embodiment of FIG. 4, the air flow sensor 31 measures a flow of air allowed by the throttle plate. The air flow sensor 31 may be a mass airflow sensor (MAF sensor or air mass meter) that measures the quantity of air that is flowing into the throttle body and/or the intake manifold. Sensor data from the air flow sensor 31 may include a series of flow values and timestamps associated with the flow values. For example, the sensor data may include flow value and time value pairs in a vector or matrix.

The controller 100 is configured to perform the comparison of the air flow level to the threshold. In other examples, the air flow sensor 31 is configured to detect a throttle position and the controller 100 is configured to perform the comparison of the throttle position to the threshold. The air flow sensor 31 may be a manifold air pressure (MAP) sensor that determines the current pressure in the manifold.

The fuel injector 16 generates a control signal to expel fuel through a nozzle into the cylinder of the engine 10. The memory 20 includes at least one time value for controlling the fuel injector 16 based on the sensor data. The at least one time value may be stored in a calibration layer of control logic for the controller 100. The at least one time value may be 5, 10, 15, 20, 25, 50, 100 or 500 milliseconds. In other examples, the at least one time value may be longer, for example, as high as 1 second. However, the time values may be selected based on the timing of the single cylinder engine. The time value may be less than a time value selected for a multi-cylinder engine. Because in a single cylinder engine, there are no other cylinders to share work output, the cylinder shutdown or deactivations must be relatively short (milliseconds, or seconds) to avoid the engine shutting down. A similar implementation in a multi-cylinder engine could turn one cylinder off for a relatively long time (seconds, minutes, or hours).

Moreover, in a multi-cylinder engine, one or more cylinders could be disabled while maintaining the combustion cycle in one or more other cylinders. In a single cylinder engine, this is not possible. With only one cylinder, the single cylinder is either operating or it is not. Thus, the time value for disabling the fuel injector 16 of the engine 10 may be selected to maintain the combustion cycle of the single cylinder without stalling the engine 10. The controller 100 may select a time value small enough to prevent stalling of the engine 10, which may be based on the combustion cycle of the engine 10 or the spark plug timing for the engine 10. The time value may provide a duty cycle of less than 50% and greater than minimum duty cycle for the fuel injection signal. This time value, or minimum duty cycle, may be calculated by based on the specific application. Each application may react differently, so a test process may be applied in which the ignition is cut (turn the key off) at different running conditions in the application. The engine speed (rpm) drop, or coast down, may be monitored. The overheat fuel cut may be selected to correspond to speed or rpm drops between 10 to 300 rpm. When the typical operating rpm of an engine is 4000 down to 1000 rpm, limiting the rpm drop to such a small range will avoid engine stalling. By controlling the time value to be small enough to prevent stalling, the inertia in the drive chain of the engine 10 will keep the engine 10 running even if the fuel injector 16 is disabled for a small amount of time.

The controller 100 is configured to perform a comparison of the engine condition to a threshold and in response to the comparison, generate a command to deactivate the fuel injector 16 after a first predetermined time period defined by the at least one time value. The command to deactivate the fuel injection cuts fuel supply to the single cylinder engine 10.

In one example, the at least one time value includes a first time value and a second time value. The first time value corresponds to the first predetermined time period associated with the first command to deactivate the fuel injector 16. The second time value corresponds to the second predetermined time period associated with the second command to reactivate the fuel injector 16. The memory 20 may store a calibration frequency for deactivation that indicates how often the deactivation period is started and stopped. The reactivation period may not be specified. That is, the reactivation period may be defined as the time when the fuel injector 16 is not deactivated.

The controller 100 is configured to perform a comparison of the engine condition to a threshold and in response to the comparison, generate a first command to deactivate the fuel injector 16 after a first predetermined time period and a second command to reactivate the fuel injector 16 after a second predetermined time period. The memory 20 may also store the threshold in the calibration layer of control logic for the controller 100 (i.e., it is user selectable). After the second time period, the controller 100 returns to the first time period and deactivates the fuel injector 16 again. This process repeats. The process may repeat until the temperature of the engine 10 falls below the threshold, or falls below a hysteresis value that is less than the threshold.

In one example, there are multiple temperature sensors 14. For example, the temperature sensors 14 may be located at an oil compartment, a radiator, an engine block, or another location. The results of the temperature sensors 14 may be combined to a single value (e.g., a weighted average of any combination of the temperature of the oil compartment, the temperature of the radiator, and the temperature of the engine block) that is compared to the thresholds. Alternatively, sensor data from each of the temperatures sensors 14, or a combination thereof, may be compared to corresponding thresholds.

The indicator light 22 may illuminate is response to the controller 100. The controller 100 is configured to generate an indicator signal to trigger the indicator light in response to the comparison. The indicator light 22 may be replaced with another annunciator (e.g., speaker, vibration device, or other device to attract attention from the operator).

In some examples, the memory 20 includes different temperature thresholds. A lower threshold may be used in the comparison for the indicator light 22. A higher threshold may be used for the comparison for deactivating the fuel injector 16. In this way, the indicator light 22 is illuminated before (e.g., at lower temperatures) without deactivating the fuel injector 16. At higher temperatures, the fuel injector 16 is deactivated. The indicator light 22 may or may not be illuminated at higher temperatures at the same time as deactivating the fuel injector 16.

In some example, the memory 20 includes different time delays for deactivating the fuel injector 16 for different temperatures. In this way, higher temperatures correspond to longer deactivation time periods for the fuel injector 16. Longer deactivation time periods increase the cooling effect from reduced combustion in the engine 10. The memory 20 may include a one dimensional table that associated multiple temperature thresholds each with a corresponding delay time period.

In some examples, the time values and/or thresholds are selected by the controller 100. The controller 100 may access a lookup table in the memory 20 according to one or more parameters in order to access a time value or threshold.

Table 1 includes an example in which the parameter is a model of the engine 10 or model of a component of the engine 10. Different models of engine may overheat at different temperatures. Thus, the threshold is different according to model of the engine 10. The component of the engine 10 may be part of the cooling system (e.g., radiator, fins, or water cooling system). These different components may affect the temperature associated with overheat. Thus, the threshold is different according to model or type of a component of the engine 10.

Similarly, the amount of time that the fuel injector is deactivated, or the cylinder is otherwise disabled, may depend on the model of the engine 10 or model of a component of the engine 10.

Different models of engine may dissipate heat at different temperatures. Thus, the threshold is different according to model of the engine 10. The component of the engine 10 may be part of the cooling system that causes the heat to dissipate or the engine 10 to cool at different rates. Thus, the threshold is different according to model or type of a component of the engine 10.

TABLE 1

|  | Threshold | Time Value |
|---|---|---|
| Model A | $X_1$ | $T_1$ |
| Model B | $X_2$ | $T_2$ |
| Model C | $X_3$ | $T_3$ |

Table 2 includes an example in which the parameter is an inertia value of the engine 10 or a component of the engine 10. The inertia value may be a moment of inertial, an angular mass, or a rotational inertia. The inertia value may describe the engine's or rotational engine component's tendency to resist angular acceleration. The inertia value may be estimated through a sum of the products of the mass each of the rotational engine components with the corresponding square of its distance from the axis of rotation. The inertia value may be based on the stored kinetic energy in the rotating components of the engine 10. The rotating components of the engine 10 may include one or a combination of a crankshaft, a connecting rod, and a counterweight. In addition or in the alternative, the inertia may be associated with a device coupled to the engine 10 such as a transmission or a load device (e.g., pump, wheel, blade, etc.). In some examples, when the engine 10 is coupled a generator, or another electric machine, the inertial value may be the ratio of the stored kinetic energy in the rotor to a rating of the electric machine.

TABLE 2

|  | Threshold | Time Value |
|---|---|---|
| Inertia A | $X_1$ | $T_1$ |
| Inertia B | $X_2$ | $T_2$ |
| Inertia C | $X_3$ | $T_3$ |

In other examples, the controller 100 may adjust values in the lookup table according to sensor data. The sensor data may describe an inertial constant of one or more components of the engine 10. The sensor data may describe the load on the engine 10. That is, the inertia value may be determined in real time according to the conditions on the engine 10. The time value for deactivating the fuel injection of the engine 10 may be adjusted according to the real time conditions. For example, when the load on the engine 10 is increased, the time values may be decreased so that the deactivation cycle is reduced. In another example, when the ambient temperature near the engine 10 is increased the temperature threshold may be increased.

Figure 5:
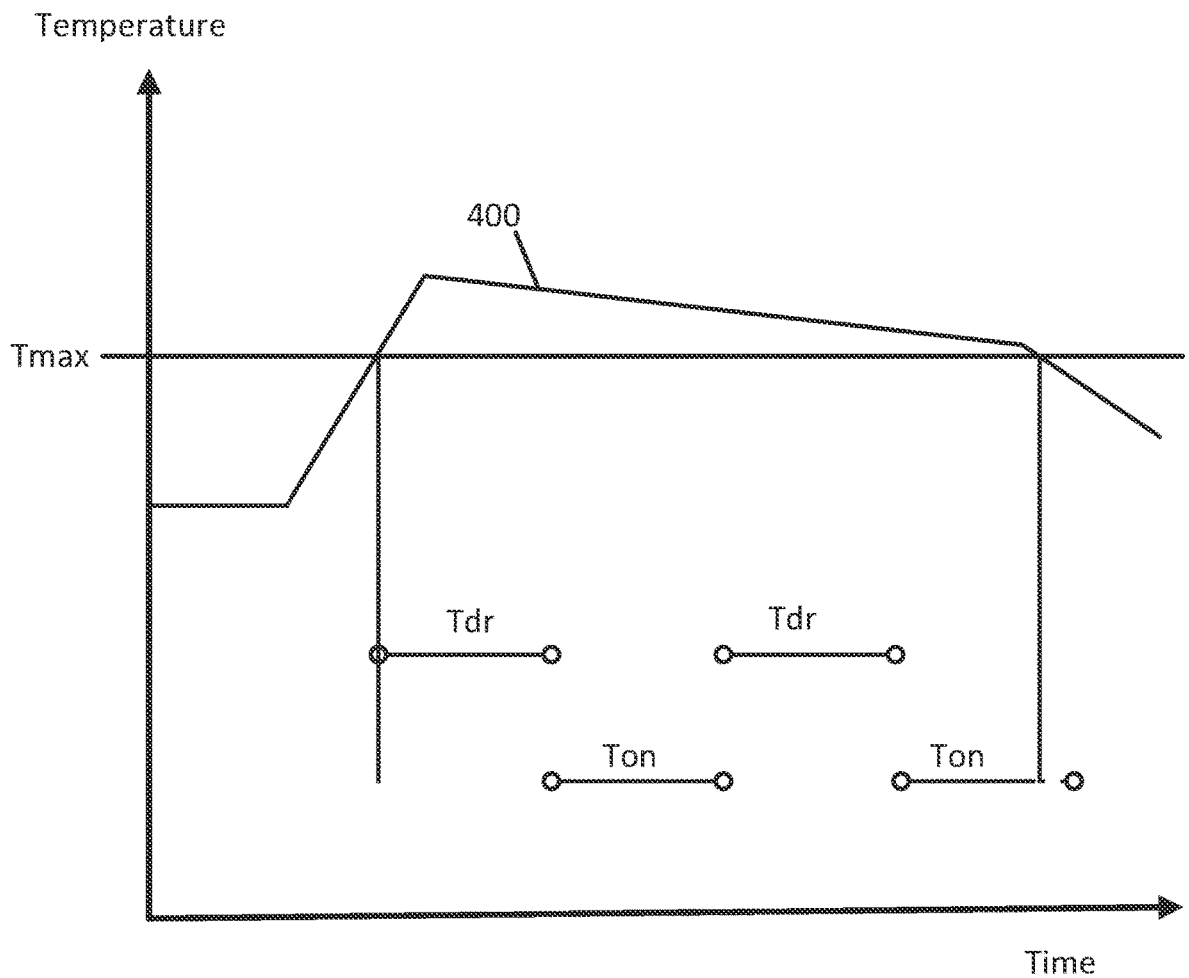
FIG. 5 illustrates a timing chart for a sequence to control a fuel injector.
Figure 7:
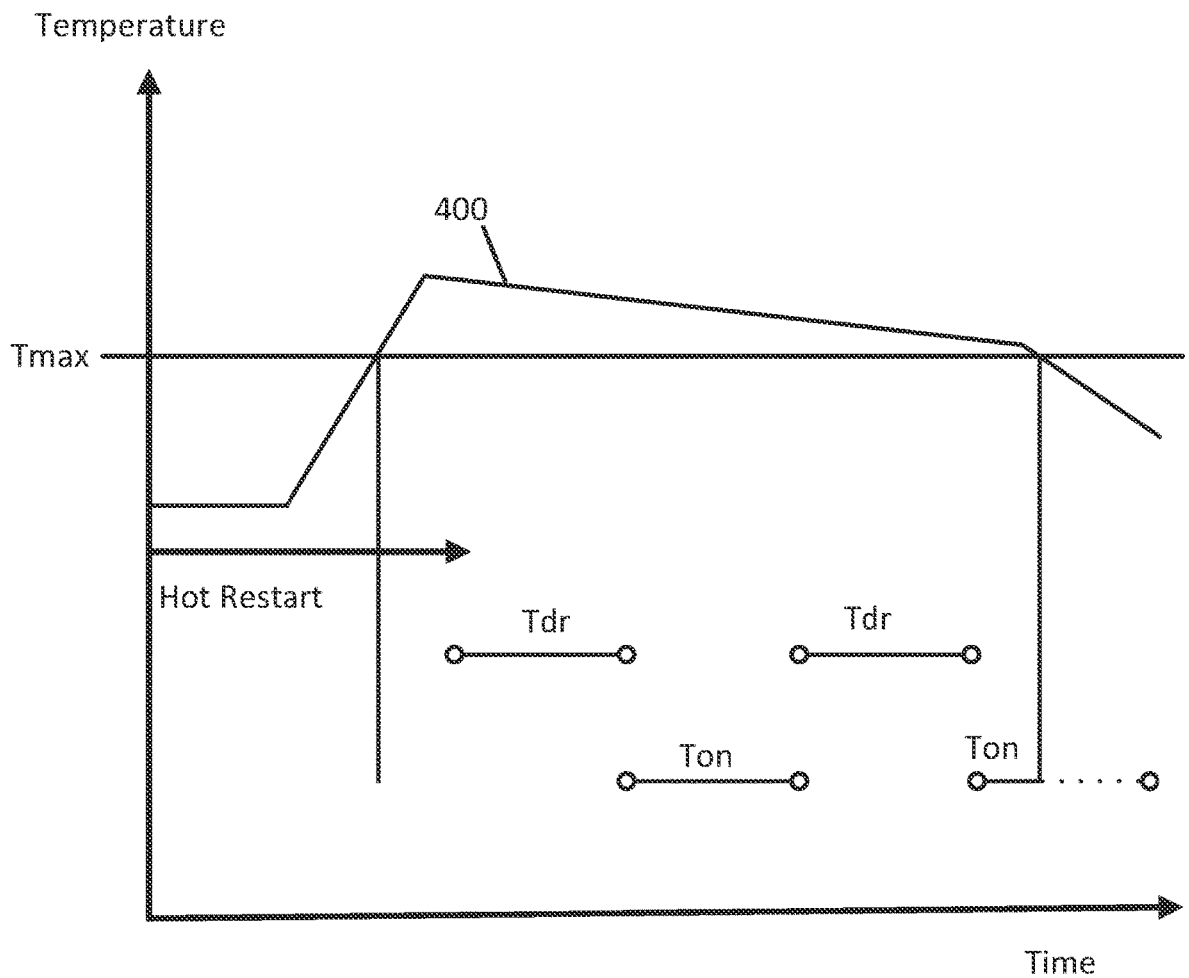
FIG. 7 illustrates a timing chart including a hot restart.

FIGS. 5 and 7 illustrate timing charts. On the Y-axis is temperature at a threshold Tmax. On the X-axis is time. The time duration for derating or deactivating the fuel injector 16 is $T_{dr}$. The time period for reactivating or turning on the fuel injector 16 is $T_{on}$. It should be noted that the vertical position of the time periods $T_{dr}$ and $T_{on}$ are not related to the Y-axis scale but presented at different positions on the timing chart merely for ease of illustration.

Referring to FIG. 5, when the temperature 400 of the engine 10 reaches the threshold $T_{max}$, that the derate time period Tdr begins. Immediately following the derate time period $T_{dr}$, the controller reactivates the fuel injector 16 in time period $T_{on}$. The cycle repeats until the temperature 400 falls below the threshold Tmax. It should be noted from FIG. 5 that the second time period $T_{on}$ is shortened because the temperature 400 falls below the threshold $T_{max}$, which is indicated by a dotted line.

The ratio of the derate time period $T_{dr}$ to the on time period $T_{on}$ may be stored in the memory as a deactivation ratio or duty cycle. Examples for the deactivation ratio include 1, 1/2, 2, 5, 1/10, and 10. Other examples are possible.

Figure 6:
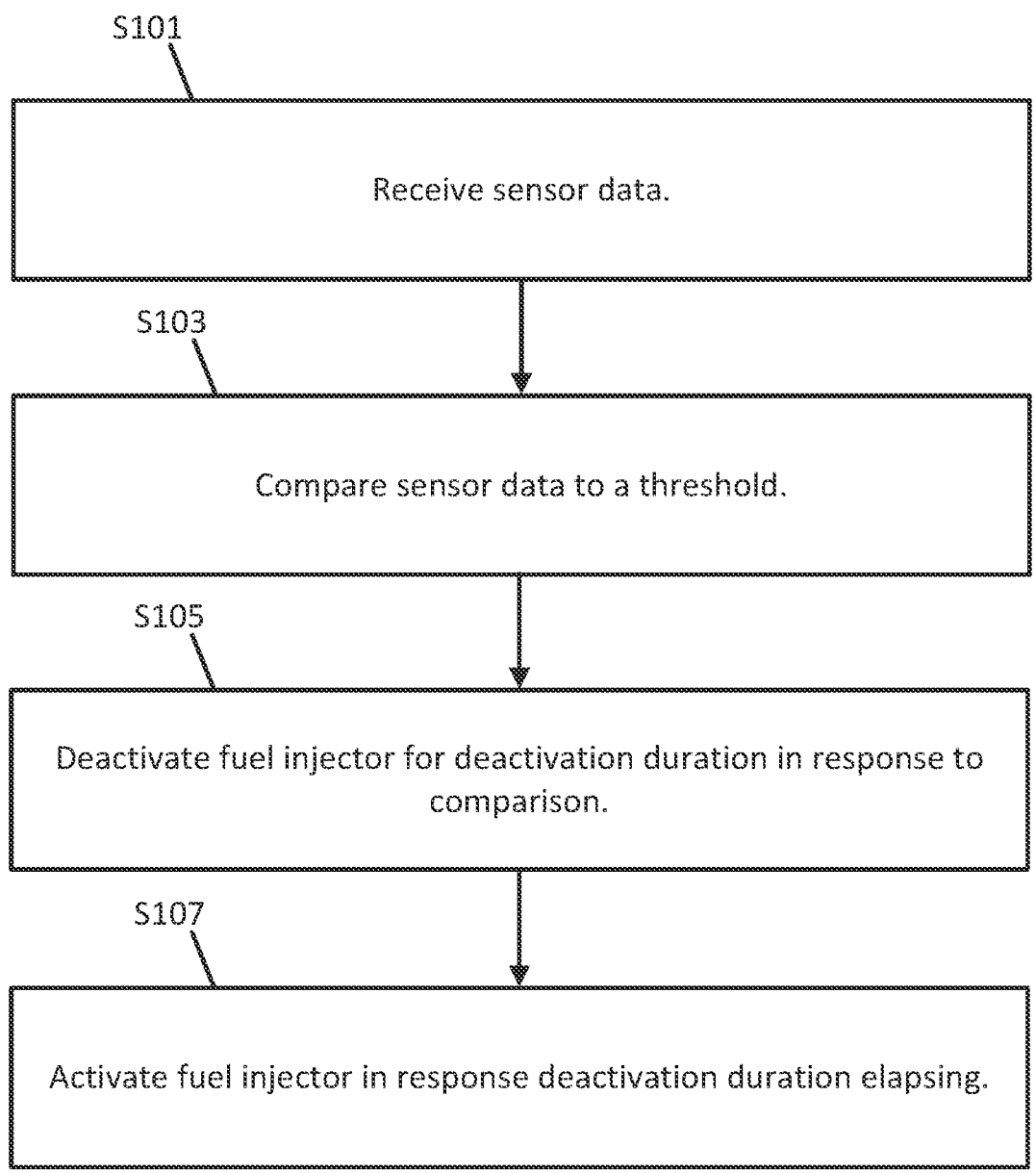
FIG. 6 illustrates an example flowchart for the controller of FIGS. 2-4.

FIG. 6 further illustrates a method for prevention of overheat in a single cylinder engine. The acts of the method may be performed by the controller 100 and/or other components described herein, for examples, with respect to FIGS. 2-4. Additional, different or fewer acts may be included.

At act S101, the controller 100 receives sensor data collected at one or more sensors associated with the engine. The sensor data may be received at a communication interface for the sensors (e.g., a circuit or a pin assigned to the sensor). The sensor data may be accessed by the controller 100 from memory.

At act S103, the controller 100 compares the sensor data to a threshold. Different thresholds may be applied to different types of sensor data. The threshold may be selected based on engine model, fuel type, historical measurements, or engine load.

At act S105, the controller 100 sends an instruction to deactivate fuel injector 16 for a deactivation duration in response to the comparison. The deactivation duration is selected to move a rotating component of the single cylinder engine from a first combustion cycle to a second combustion cycle. In some examples, the controller 100 queries a lookup table using the inertial value or a model of the single cylinder engine and receives the deactivation duration from the lookup table.

At act S107, the controller 100 sends an instruction to activate fuel injector 16 in response to the deactivation duration elapsing. The fuel injector 16 may be activated by sending a command or control signal from the controller 100 to the fuel injector 16. The command or control signal may change state initially to activate the fuel injector 16 and change state a second time to deactivate the fuel injector 16. For example, the control signal may transition from a low state to a high state to activate the control signal and transition from the high state to the low state to deactivate the control signal.

FIG. 7 illustrates a timing chart with a hot restart delay. The hot restart delay delays the comparison of the sensor data with the temperature threshold $T_{max}$ until a time delay has passed since the engine 10 was started. The hot restart is included to address a particular situation. The cooling of an air cooled is facilitated by it running. In other words, in some scenarios, the engine 10 may actually heat up after the engine 10 is turned off because the effects of the cooling path are lessened when the engine 10 is running. This is because turning off the engine 10 stops the cooling system. If the engine 10 is restarted when it is already hot, that is above the temperature threshold $T_{max}$, it may risk immediately starting the deactivation cycle for the fuel injector 16. This may not be desirable. To prevent this sequence of events, the controller may implement hot restart delay. Under the hot restart delay, even if the engine temperature 400 is above the temperature threshold, the deactivation time period $T_{dr}$ does not start. The deactivation time period Tdr starts only after the hot restart time period elapses.

Figure 8:
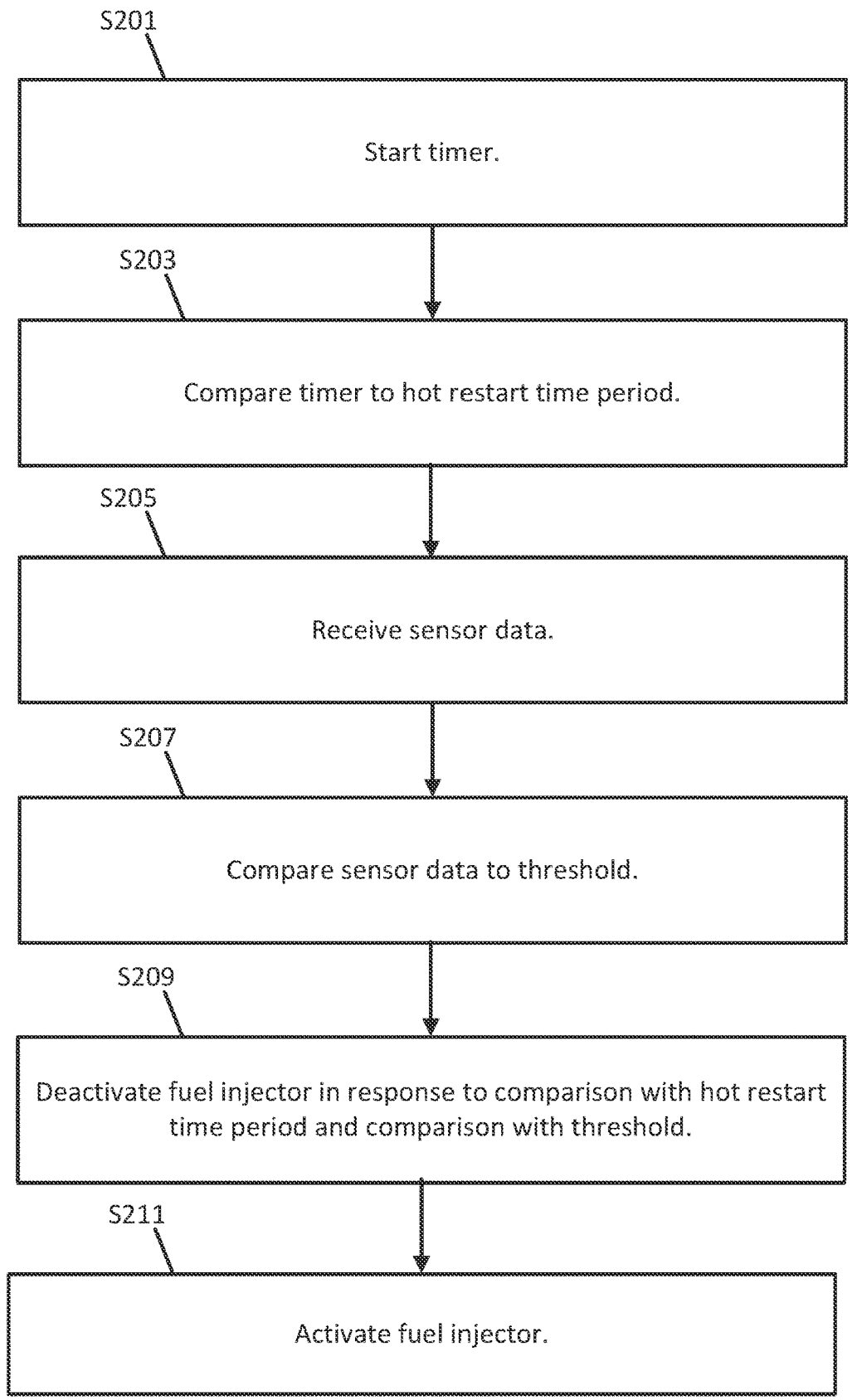
FIG. 8 illustrates an example flowchart for the controller of FIGS. 2-4.

FIG. 8 further illustrates another method for prevention of overheat in a single cylinder engine. The acts of the method may be performed by the controller 100 and/or other components described herein, for examples, with respect to FIGS. 2-4. Additional, different or fewer acts may be included.

At act S201, the controller 100 starts a timer. The time may be implemented by a hardware component such as timer 18. The timer may count time that has elapsed since the timer was started.

At act S203, the controller 100 compares the timer to a hot restart time period. The hot restart time period may be set according to a type of engine or an application of the engine. The hot restart time period may depend on one or more cooling properties of the engine. The hot restart time period may be a period of time required for the engine to cool a predetermined proportion or amount.

At act S205, the controller 100 receives sensor data. The sensor data may be of the type described herein including, but not limited to, temperature sensor data, air to fuel ratio sensor data, or air flow sensor data. The sensor data may include multiple types of sensor data.

At act S207, the controller 100 compares the sensor data to a threshold. Different types of engines or engine applications may be associated with different thresholds. The threshold may be selected according to the inertial properties of the rotating components of the engine. The user may select the threshold. The threshold may vary over time.

At act S209, the controller 100 deactivates a fuel injector 16 in response to the comparison with the hot restart time period and in response to the comparison of the sensor date with the threshold and act S211 to activate the fuel injector 16.

The indicator light 22 provides a reminder to the operator to check for problems with the engine 10. For example, the operator may clear debris from the engine 10. The indicator light 22 may illuminate at a first temperature threshold. If the user does not address the problem, and the temperature increases more, deactivation of the fuel injector 16 is started. This may cause the engine 10 to vibrate, slow down, or otherwise operate abnormally because fewer fuel injections and combustion events are taking place. This abnormal condition may attract attention from the operator so that the operator can clear the debris or otherwise address the problem. However, if the operator is unaware of the condition, it may at least cause the operator to request service or take the engine 10 to a service technician. In the case of a vehicle, the operator may be able to operate the engine 10 in "limp mode" when the deactivation cycle is taking place to drive the vehicle home or to the service technician.

The engine 10 may be included in an engine-generator set, which may be referred to as a generator or a genset, may include an engine driven alternator or another combination of devices for generating electrical energy or power. One or more generators may provide power to a load through a generator bus. The generator bus is an electrically conductive path and may be selectively connected through multiple circuit breakers or other types of switches to the generators, the utility system, and other devices.

The phrases "coupled with" or "coupled to" include directly connected to or indirectly connected through one or more intermediate components. Additional, different, or fewer components may be provided. Additional, different, or fewer components may be included.

The processor 19 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 20 may be a volatile memory or a non-volatile memory. The memory 201 may include one or more of a read only memory (ROM), random access memory (RAM), a flash memory, an electronic erasable program read only memory (EEPROM), or other type of memory. The memory 20 may be removable from the network device, such as a secure digital (SD) memory card.

In addition to ingress ports and egress ports, a communication interface of the controller may include any operable connection. An operable connection may be one in which signals, physical communications, and/or logical communications may be sent and/or received. An operable connection may include a physical interface, an electrical interface, and/or a data interface.

The communication interface may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

An input device may receive user inputs for temperature thresholds and delay periods. The input device may include a button, a switch, a keypad, a touchscreen, a key, an ignition, or other structure configured to allow a user to enter data or provide a command to operate the engine. The input device may include a connection to a network, a smartphone, a tablet, a personal computer configured to electronically transmit the command to the engine. The communication may be wireless or wired (e.g., received by the communication interface).

While the computer-readable medium (e.g., memory 20) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An engine comprising:
   a cylinder;
   at least one sensor configured to generate sensor data for an engine condition;
   a fuel injector configured to deliver fuel to the cylinder; and
   a controller configured to perform a comparison of the engine condition to a threshold value and in response to the comparison, generate a first command to deactivate the fuel injector for a first predetermined time period and a second command to reactivate the fuel injector for a second predetermined time period, wherein the first predetermined time period is selected to maintain the combustion cycle of the engine;
   wherein a duty cycle of the engine is less than 50% when the engine condition exceeds the threshold value.

2. The engine of claim 1, wherein the at least one sensor is configured to detect a temperature and the controller is configured to perform the comparison of the temperature to the threshold value.

3. The engine of claim 2, wherein the at least one sensor includes a plurality of temperature sensors associated with at least two engine locations selected from an oil compartment, a radiator, and an engine block.

4. The engine of claim 1, wherein the at least one sensor is configured to detect an air to fuel ratio and the controller is configured to perform the comparison of the air to fuel ratio to the threshold value.

5. The engine of claim 1, wherein the at least one sensor is configured to detect an air flow level and the controller is configured to perform the comparison of the air flow level to the threshold value.

6. The engine of claim 1, wherein the at least one sensor is configured to detect a throttle position and the controller is configured to perform the comparison of the throttle position to the threshold value.

7. The engine of claim 1, wherein the first predetermined time period is selected to correspond to a speed drop of between 10 and 300 revolutions per minute.

8. The engine of claim 1, further comprising:
   a memory configured to store a plurality of user configurable parameters including:
   a first time value for the first predetermined time period associated with the first command to deactivate the fuel injector; and
   a second time value for the second predetermined time period associated with the second command to reactivate the fuel injector.

9. The engine of claim 1, wherein the controller is configured to delay the comparison for a hot restart time period.

10. The engine of claim 1, further comprising an indicator light, wherein the controller is configured to generate an indicator signal to trigger the indicator light in response to the comparison.

11. The engine of claim 1, wherein the ratio of the first predetermined time to the second predetermined time is selected to prevent stalling of the engine.

12. The engine of claim 1, further comprising a governor configured to maintain a speed of the engine through variable loads.

13. The engine of claim 12, wherein the governor is an electronic governor and the controller is configured to send a governor command to the electronic governor in response to the comparison of the engine condition to the threshold value.

14. A method for operation of an engine, the method comprising:
   receive sensor data;
   compare the sensor data to a threshold value;
   deactivate a fuel injector of the engine for a deactivation duration in response to the comparison; and
   activate the fuel injector in response to the deactivation duration elapsing;
   wherein the deactivation duration is selected to maintain the combustion cycle of the engine; and
   wherein a duty cycle of the engine is less than 50% when the sensor data exceeds the threshold value.

15. The method of claim 14, wherein the deactivation duration is selected to move a rotating component of the engine from a first combustion cycle to a second combustion cycle.

16. The method of claim 14, further comprising querying a lookup table using an inertial value or a model of the engine and receiving the deactivation duration from the lookup table.

17. The method of claim 14, wherein the sensor data includes at least one temperature value, at least one air to fuel ratio value, or an air flow level.

18. A method comprising:
   a) starting a timer;

b) comparing the timer to a hot restart time period, wherein the hot restart time period is selected to maintain the combustion cycle of an engine;
c) receiving sensor data;
d) comparing the sensor data to a threshold value;
e) deactivating a fuel injector in response to the hot restart time period being greater than the timer and in response to the sensor data exceeding the threshold value;
f) activating the fuel injector when the hot restart time period is less than the timer and restarting the timer; and
g) repeating steps c) through f) until the sensor data is less than the threshold value;
wherein a duty cycle of the engine is less than 50% when the sensor data exceeds the threshold value.

19. The method of claim 18, wherein the sensor data includes at least one temperature value, at least one air to fuel ratio value, or an air flow level.

20. The engine of claim 1 further comprising a memory, the memory configured to store a table, the table comprising a plurality of engine models and an inertia value for each of the plurality of engine models, the inertia value used to determine either the duty cycle or the first and second predetermined time periods.

* * * * *